Jan. 16, 1945.  W. M. AHLSTROM ET AL  2,367,176
FLUID METER
Original Filed Aug. 5, 1938   2 Sheets-Sheet 1

William M. Ahlstrom, Richard J. Tischler
and Frank H. Parsons INVENTORS
BY Hawgood and Van Horn
ATTORNEYS Patented Jan. 16, 1945

2,367,176

UNITED STATES PATENT OFFICE 2,367,176

FLUID METER

William M. Ahlstrom, Mentor, and Richard J. Tischler and Frank H. Parsons, Fairport Harbor, Ohio Original application August 5, 1938, Serial No. 223,284. Divided and this application June 30, 1941, Serial No. 400,496

10 Claims. (Cl. 73—202)

This invention relates to fluid measuring means.

An object of the invention is to provide improved fluid measuring means which will accurately measure the flow of fluid throughout a wide range of variation.

Another object is to provide an improved fluid measuring means which will not materially impede the flow of the fluid which is being measured.

Another object is to provide an improved fluid measuring means which may be easily manufactured.

Another object is to provide an improved fluid measuring means which may be readily applied to existing fluid conducting systems.

Another object is to provide an improved fluid measuring means which will magnify variations in fluid pressure.

Other objects will hereinafter appear.

The invention will be better understood from the description of several practical embodiments thereof, illustrated in the accompanying drawings, in which.

This application is a division of our copending application, Serial Number 223,284, filed August 5, 1938, now Patent No. 2,250,739, issued July 29, 1941.

The above mentioned parent application shows one manner in which fluid measuring devices, such as constitute the subject matter of this application, may be used in conjunction with calculating apparatus, and specifically shows a type of apparatus in which the fluid which is measured is the fuel supplied to an internal combustion engine and in which this measurement enters into the calculation of mileage per unit quantity of fuel.

While it is intended that the flow devices of this application may be used in conjunction with such calculating apparatus or other indicating, control, or like devices, such devices are not illustrated, excepting rather generally and diagrammatically, being included solely for purposes of completeness of disclosure and not constituting per se the invention which it is desired to protect through this application, the terms "fluid meter," "fluid measuring means," and the like, being used to comprehend all such devices.

Figure 1:
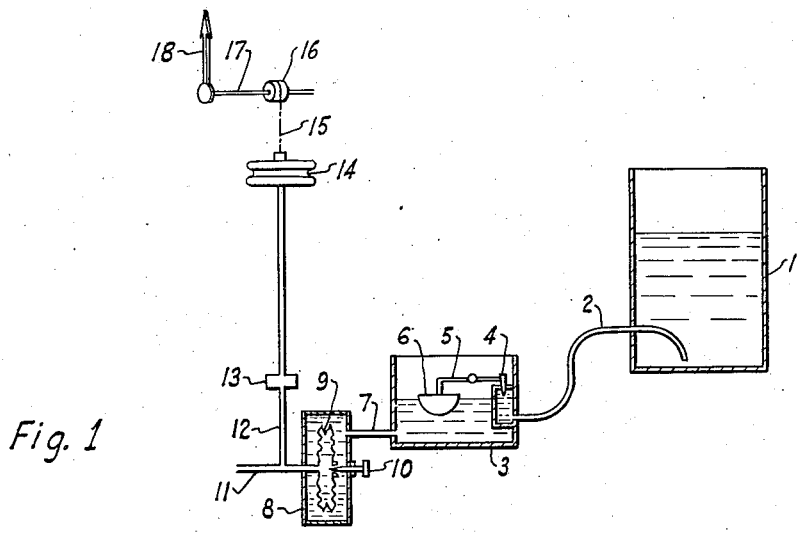
Figure 1 is a diagrammatic illustration of the parts embodying the invention as applied to liquid delivered under a substantially constant head.

In Figure 1, a liquid such as gasoline or other fuel is stored in a tank indicated at 1, from which it may be conducted by a pipe 2 to an auxiliary tank or float chamber 3, the level of the liquid in the float chamber being controlled by a valve 4 mounted on one end of a pivoted lever 5, to the other end of which is secured a float 6.

From the float chamber the liquid may pass through a pipe or conduit 7 to a casing 8, containing a pressure responsive device such as a bellows 9 and an adjustable orifice area controlling valve 10 arranged as hereinafter described, the fluid passing from the exterior of the bellows to its interior, and thence through a pipe or conduit 11 to its point of delivery, such for instance as the engine, it being connected in conventional manner to the carburetor, or the like, thereof.

Figure 3:
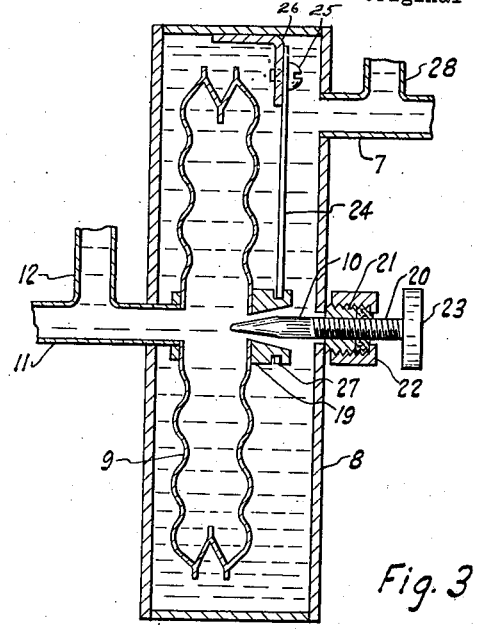
Figure 3 is an enlarged sectional view of a portion of the mechanism shown in Figure 1.
Figure 5:
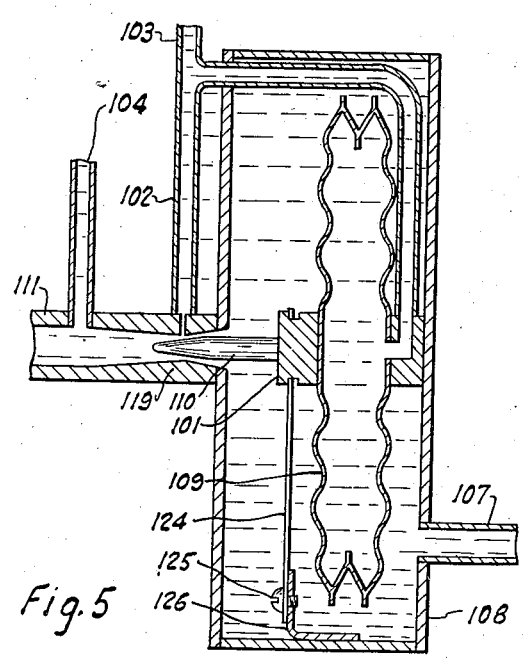
Figure 5 is a view similar to Figure 3 showing a modified form of flow device.

The bellows 9 and valve 10 are so adjusted that the pressure differential between inlet and outlet of casing 8 is directly proportional to the volume flowing through the conduit 11 per unit time, as will be more fully pointed out in the descriptions of Figures 3 and 5.

Conduit 11 has connected thereto an upwardly extending pipe or conduit 12 which is expanded at 13 into a chamber at about the level of the liquid in float chamber 3, and which serves to prevent surging of the liquid upwardly through conduit 12.

At the upper end of conduit 12 is provided a pressure responsive device shown as a bellows 14 connected by a flexible band 15 to a drum 16 fixed on a shaft carrying a pointer or indicator 18.

A substantially constant gravitational head or pressure is maintained upon the liquid in fluid chamber 3 by the valve 4 and float 6, which maintains the level in this chamber at a fixed elevation above the pipe 11 through which the liquid is drawn to its point of delivery.

As greater demand is placed upon the delivery of liquid, as by a greater suction such as that due to a higher engine speed or wider open throttle, the suction will be imposed upon the liquid contents of pipe 11, and being transmitted through pipe 12 to bellows 14, cause the bellows to collapse in proportion to the suction, rotating the shaft 17 through connection 16 and moving pointer 18.

It is important that the movement of the head of bellows 14 be in exact and direct proportion to the flow of liquid through pipe 11, and, inasmuch as the flow through a fixed orifice is not directly proportional to the difference in pressure existing on both sides, it is necessary to provide a passage for the liquid which will vary in cross-sectional area in such a manner that the flow through pipe 11 will be directly proportional to the pressure or suction existing in this pipe.

It is also essential that differences in the flow be accurately reflected in the pressure in pipes 11 and 12 throughout a range covering the entire operability of the device, and particularly with previous devices is it difficult to maintain this accuracy when very small quantities of liquid are passing, as when the engine is idling or operating at very light loads.

To overcome these difficulties, there is provided a device having an orifice of variable area, together with means for automatically varying the area, so that the pressure in pipes 11 and 12 is at all times directly proportional to the amount of liquid passing through pipe 11.

In the embodiment illustrated in Figures 1 and 3, there is provided within the casing 8 a bellows 9, the interior of which communicates with pipe 11. Fluid is permitted to pass to the interior of the bellows through a bushing 19 sealed about a perforation shown as in alignment with the end of pipe 11, and extending into this bushing is the end of an orifice restricting member or spaced plug 10 shown as of tapering, generally conical shape, and somewhat more acute than the surrounding conical aperture of bushing 19.

The plug has a threaded shank 20 threaded into a boss 21, welded or brazed to the casing 8, which is also externally threaded to receive a packing gland 22.

The plug, of course, may be readily rotated to adjust it axially with respect to bushing 19, by a knurled or similar head 23.

A leafspring 24 is secured by means of a screw 25 and bracket 26 to the casing, and has its end forked to enter an annular recess 27 formed in bushing 19, and arranged to move this bushing in the direction of the plug, opposing the pressure of the liquid surrounding the bellows 9 and inside the casing 8.

It will be apparent that, as the suction of pipe 11 increases, the walls of bellows 9 tend to collapse and to move the bushing 19 to the left (as seen in Figure 1) increasing the conical-annular space between the interior of the bushing and the plug, and thus permitting a larger cross sectional stream of liquid to pass to the interior of the bellows and to the pipe 11.

It will be understood that to obtain this result the strength of spring 24, together with the pressure exerted by the walls of the bellows itself, must be carefully calibrated, and that the orifice of bushing 19 and the point of the plug 10 must be so designed that the area of the annular opening between them is always equal to $$\sqrt{\frac{F^2}{2GH}}$$

(where F is the flow measured in units of volume per unit of time, G is the acceleration due to gravity, and H is the pressure differential between pipes 7 and 11).

Figure 4:
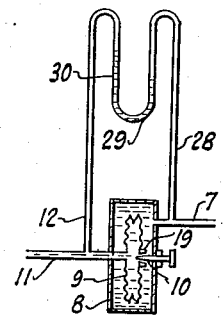
Figure 4 is a diagrammatic view of the same apparatus as shown in Figures 1 and 3 showing it connected to a monometer type of tube to provide a simple manner of indicating the flow of fluid.

In Figure 4, pipe 7 is shown as provided with a branch 28 which does not appear in Figure 1. This is necessary when the device is to be used in situations where there is not a constant and known head or pressure upon the liquid entering through pipe 7 and one manner of its use is diagrammatically indicated in Figure 4.

From this figure, it is apparent that pipes 12 and 28 may have connected between them a U-tube 29, partially filled with mercury or other heavy liquid 30, and the difference in heighth of the level of the liquid in the two arms of the U will be an indication of the difference in pressure existing in pipes 7 and 11.

Inasmuch as the proportions of the orifice bushing 19 and plug 10 have been so chosen that this difference in pressure is directly proportional to the flow of fluid through the orifice, the heighth of the fluid 30 at one leg of the U tube over that in the other directly tells the rate of flow.

It will be appreciated that the return pipe 28 can be omitted from apparatus such as shown in Figure 1 because its place is taken by atmospheric pressure which exerts itself equally upon the surface of the liquid in tank 3 and upon the exterior of bellows 14.

Figure 5 shows another form of liquid-flow-pressure-controlling device, in which the orifice controlling the flow of fluid is made in the form of a venturi 119 constituting the end of the liquid discharge pipe 111, while into the throat of the venturi projects a tapered valve-like member or plug 110 carried by a bellows 109, to which it is attached by means of an annularly grooved boss 101.

The tapered plug causes the area of the Venturi throat to vary automatically, so that the pressure differential from the throat to either end of the venturi is directly proportional to the flow of the fluid through the tubes 107 and 111.

This form of device has an added advantage in that the velocity energy imparted to the fluid during its approach to the Venturi throat is regained in its travel from the throat to the outlet.

With the device so designed that the cross sectional area of the throat varies as the $$\sqrt{\frac{F^2}{2GH}}$$

the pressure differential from the throat to either the inlet or outlet varies directly with the flow.

The bellows 109 is enclosed within a casing 108 and is assisted in remaining in expanded position by a spring 124 attached by a screw 125 to a bracket 126 fastened to the interior of the casing. Liquid enters through supply pipe 107.

Pressure within the bellows 109 and at the throat of the venturi is equalized by a bypass-like tube 102. Another tube 103 from the pipe 102 extends to the pressure responsive device and the dial actuating mechanism of the instrument.

The above described parts are all that are necessary where fluid is supplied at a fixed head, as illustrated in Figure 1.

Figure 6:
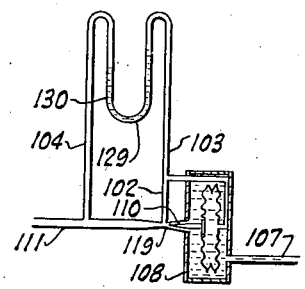
Figure 6 is a diagrammatic view similar to Figure 4 showing connections with the device of Figure 5.

However, when the head of the supply varies, a tube 104 is connected with the supply line 111, at either end or beyond the venturi 119, and a pressure indicating device, such as the U tube 129 filled with mercury 130, is connected between tubes 103 and 104, as shown in Figure 6.

The difference of the level of the fluid 130 will, as in the first embodiment, be directly proportional to the flow of liquid through conduits 111 and 107, with the parts proportioned as above described.

Figure 2:
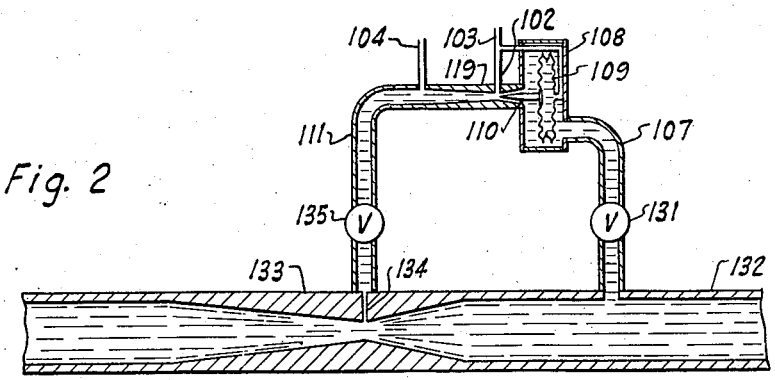
Figure 2 is a fragmentary sectional view of a fluid flow responsive apparatus applied to a section of pipe line or similar conduit.

In Figure 2, an application of a device such as shown in Figures 5 to 6 to a large conduit is illustrated.

The parts are similar to those just described, with tubes 103 and 104 leading to the indicating part of the instrument, but tube 107 is now connected through a valve 131 to one side fo a larger conduit 132 in which is placed a larger venturi 133 and the tube 111 is connected to the throat 134 of this venturi through a valve 135.

Of course, it will be apparent that the device of Figure 2 may be used to actuate any desired or known type of instrument by which the flow of liquid may be determined, or by which an apparatus may be controlled in accordance with this flow, and that the apparatus may be of an indicating nature or provided with any desired recording instrument or the like. When used hereinafter, the term "measuring device," or "measuring apparatus," or the like, will be understood to mean any apparatus actuated in accordance with the flow of fluid whether used to indicate or record this flow or to control or actuate other apparatus or devices.

This arrangement is an improvement over any other known method, in that the head for operating the indicating or recording instrument is many times greater than that due solely to, and also varies directly with, the flow. The fluid flowing through the venturi produces a "velocity head" between 132 and 134 which is proportional to the square of the flow, while the flow of fluid through the bypass 107 and 111 varies as the square root of the differential. Therefore the flow through the bypass, and that is through the measuring device, varies in direct proportion to the flow of the fluid in the main conduit.

In this device the operation is based upon the theory that the ratio of the flow in conduit 132 to that in conduits 107 and 111 being connected in parallel, is constant for all the heads or pressure differences, irrespective of the resistance of the conduits.

Therefore, the flow through conduit 132 may be accurately indicated by measurement of the flow through conduits 107 and 111 and the latter, as above described, may readily be interpreted from the pressures in tubes 103 and 104.

By this means a greatly increased head can be obtained for operating the measuring device over that which could be obtained directly from a Venturi or orifice plate in main line 132.

This increased head varies directly with the flow in the main conduit, and both this fact and the greater power obtainable make for ease of calibration and operation of the indicating instrument, as well as for the ability to use uniform scale markings on such an instrument.

The accuracy of the instrument is maintained throughout its entire range and a much less complicated apparatus is required than is used with present methods of measuring head.

As the device shunted around the main conduit gives an increased head, a larger Venturi throat or orifice plate may be used in the main line, which, in turn, reduces line losses of the main conduit.

If a greater head than that obtainable with the apparatus of Figure 2 is desired, one or more additional Venturi tubes may be interposed between the main conduit and the measuring device, each being connected to its preceding venturi as is the venturi of the measuring device shown in Figure 2, that is—between the throat and one end of the preceding venturi, and the pressure differentials thus can be automatically magnified to any desired degree.

While we have described the illustrated embodiments of our invention in some particularity, obviously many others will readily occur to those skilled in this art, and we do not, therefore, limit ourselves to the precise details shown and described, but claim as our invention all embodiments, variations and modifications thereof coming within the scope of the appended claims.

We claim:

1. A fluid meter comprising a main conduit provided with an orifice, a by-pass around the orifice, an enclosed chamber in said by-pass, a venturi at said chamber, a tapered orifice controlling member projecting into the throat of said venturi, a pressure responsive actuator enclosed in said chamber and having one side in communication with the throat of said venturi and the other side in communication with one end thereof, the actuator having one part fixed with respect to said orifice controlling member and having another part fixed with respect to said venturi to move them relatively and being designed to vary the pressure differential between the throat and one end of the venturi in predetermined relation to the rate of flow of fluid in the main conduit.

2. A fluid meter comprising a main conduit provided with a venturi, a by-pass between one end and the throat of said venturi, an enclosed chamber in said by-pass, a second venturi at said chamber, a tapered orifice controlling member projecting into the throat of said second venturi, a pressure responsive actuator enclosed in said chamber and having one side in communication with the throat of said second venturi and the other side in communication with one end thereof, the actuator having one part fixed with respect to said orifice controlling member and having another part fixed with respect to said second venturi to move them relatively and being designed to vary the pressure differential between the throat and one end of the second venturi in predetermined relation to the rate of flow of fluid in the main conduit.

3. A fluid meter comprising a member having an orifice through which the fluid may flow, an orifice area varying member projecting into said orifice, means for moving said members relatively and actuated by the pressure differential of the fluid passing through the orifice, the orifice and orifice controlling member being so designed that the space between them is at all times expressed by the formula $$a = \sqrt{\frac{F^2}{2gH}}$$

where $a$ is the area through which fluid may flow at the orifice, F is the flow measured in units of volume per unit of time, $g$ is the acceleration due to gravity, and H is the pressure differential.

4. A fluid meter comprising a member having an orifice through which the fluid may flow, a tapered orifice area controlling member extending into the orifice substantially centrally thereof, means for moving said members relatively and actuated by the pressure differential of the fluid passing through the orifice, the orifice and orifice controlling member being so designed that the space between them is at all times expressed by the formula $$a=\sqrt{\frac{F^2}{2gH}}$$

where $a$ is the area through which fluid may flow at the orifice, $F$ is the flow measured in units of volume per unit of time, $g$ is the acceleration due to gravity, and $H$ is the pressure differential.

5. A fluid meter comprising a casing, inlet and outlet conduits connected therewith, a pressure responsive actuator enclosed in the casing and supported thereby, a member provided with an orifice, the actuator being subjected to the differential pressures created by flow through the orifice, a tapered orifice area varying member extending into the orifice substantially centrally thereof, one of said members being fixed to and carried by the casing, and the other fixed to and carried by the pressure responsive actuator whereby they may be moved relatively, the orifice and orifice area controlling member being so designed that the space between them is at all times expressed by the formula $$a=\sqrt{\frac{F^2}{2gH}}$$

where $a$ is the area through which fluid may flow at the orifice, $F$ is the flow measured in units of volume per unit of time, $g$ is the acceleration due to gravity, and $H$ is the pressure differential.

6. A fluid meter comprising a sealed casing constituting a part of a conduit through which fluid may pass and a venturi associated therewith, a Venturi throat restricting member projecting into the venturi, a flexible bellows entirely enclosed within the casing and exposed on one side to the pressure of fluid at one end of the venturi and at its other side to the pressure of fluid at the throat of the venturi, one end of the bellows being fixed with respect to the venturi and its other end being fixed with respect to the throat restricting member causing relative motion between the venturi and throat restricting member which permits the passage of fluid at a velocity head in predetermined relation to its flow.

7. A fluid meter comprising a main conduit, a venturi therein, a by-pass connected to the conduit at a point external the venturi and at the throat of the venturi, a sealed enclosure and a second venturi constituting a part of said by-pass, a member movable into said second mentioned venturi and restricting the space therein, and fluid pressure responsive means within the enclosure having one side exposed to fluid at the end of the second venturi and its other side exposed to fluid at the throat of the second venturi, said pressure responsive means being connected to the second venturi and to the member to move them relatively and control the velocity head in predetermined relation to the flow.

8. A fluid meter comprising a sealed enclosure constituting a part of the conduit through which the fluid may flow and a venturi, a restricting member projecting therein, fluid supply means supplying fluid at a predetermined head to one end of the venturi, pressure responsive means within the enclosure and having one part stationary with respect to the venturi and another fixed to the restricing member and exposed to the pressure of fluid at the throat of the venturi whereby the pressure responsive means moves the venturi and restricting member relatively to maintain the flow of fluid through the venturi in accordance with a predetermined function of the pressure at the Venturi throat.

9. A fluid meter comprising a venturi, a Venturi throat area varying means, and a pressure responsive actuator having two relatively movable parts, one of said actuator parts being fixed relative the venturi and the other said actuator part being fixed relative the throat area varying means to move the venturi and throat area varying means relatively, the actuator being directly actuated by the pressure differential between the throat and one end of the venturi; the throat area varying means being designed to vary the Venturi throat area to maintain the pressure differential in direct proportion to the flow of fluid through the venturi.

10. A fluid meter comprising a conduit including an enclosure, a venturi, a Venturi throat area varying means, and a pressure responsive actuator enclosed within the enclosure and exposed only to the fluid passing through the meter, there being a connection between the fluid at one side of the actuator and the throat of the venturi and the other side of the actuator being subjected to the pressure at one end of the venturi, the actuator having one part fixed with respect to said venturi and having another part fixed with respect to said Venturi throat area varying means to move them relatively, the throat area varying means being designed to vary the area of the Venturi throat to maintain the pressure differential in direct proportion to the flow of fluid through the venturi, and an indicating device actuated by the pressure differential having communication with fluid at the throat of the venturi and communication with fluid at one end of the venturi.

WILLIAM M. AHLSTROM.
RICHARD J. TISCHLER.
FRANK H. PARSONS.